United States Patent
Garcia-Soto

(10) Patent No.: US 9,515,569 B2
(45) Date of Patent: Dec. 6, 2016

(54) AC/DC ELECTRICAL CONVERSION DEVICE PERMITTING ENERGY RECOVERY AND MANAGEMENT OF DC-SIDE SHORT-CIRCUITS

(71) Applicant: ALSTOM Technology Ltd, Baden (CH)

(72) Inventor: Guillermo Garcia-Soto, Massy (FR)

(73) Assignee: Alstom Technology Ltd., Baden (CH)

( * ) Notice: Subject to any disclaimer, the term of this patent is extended or adjusted under 35 U.S.C. 154(b) by 176 days.

(21) Appl. No.: 14/377,840

(22) PCT Filed: Feb. 14, 2013

(86) PCT No.: PCT/EP2013/053015
§ 371 (c)(1),
(2) Date: Aug. 8, 2014

(87) PCT Pub. No.: WO2013/120966
PCT Pub. Date: Aug. 22, 2013

(65) Prior Publication Data
US 2015/0023074 A1 Jan. 22, 2015

(30) Foreign Application Priority Data

Feb. 17, 2012 (FR) ...................... 12 51507

(51) Int. Cl.
*H02M 7/217* (2006.01)
*H02M 1/32* (2007.01)
(Continued)

(52) U.S. Cl.
CPC .............. *H02M 7/217* (2013.01); *H02M 1/32* (2013.01); *H02M 3/158* (2013.01); *H02M 7/219* (2013.01);
(Continued)

(58) Field of Classification Search
CPC ..................... H02M 7/217; H02M 2001/0003; H02M 7/219; H02M 1/32; H02M 3/158; H02M 2001/007
(Continued)

(56) References Cited

U.S. PATENT DOCUMENTS 7,755,213 B2 * 7/2010 Ang ........................ B60K 6/445
307/10.1
7,969,755 B2 * 6/2011 Davies .................. H02J 3/1864
363/35

(Continued)

FOREIGN PATENT DOCUMENTS

GB 2 447 875 A 10/2008
WO 96/18937 A1 6/1996

OTHER PUBLICATIONS

International Search Report and Written Opinion in PCT/EP2013/053015, European Patent Office, Rijswijk, NL, mailed May 17, 2013.

*Primary Examiner* — Timothy J Dole
*Assistant Examiner* — Htet Z Kyaw
(74) *Attorney, Agent, or Firm* — Nixon Peabody LLP; Khaled Shami

(57) ABSTRACT

An AC/DC electrical converter device having a source mode and a recovery mode, and for connection, on the AC side, to an AC voltage source and, on the DC side, to a DC power distribution network. It includes an AC/DC converter, a switching cell with two switches (K1, K2) that are bidirectional for current, the switches sharing a common point (A) and each having a respective end terminal (B1, B2), a filter stage, and a control unit for the cell; the converter is for connection on the AC side to the voltage source and is connected on the DC side to the cell; in use, the first switch (K1) is connected between the converter and the DC power distribution network via the filter stage, the second switch (Continued)

(K2) forming a combination in parallel with the filter stage and the DC power distribution network. The control means are able to manage a short-circuit current in source mode by operating on the first and second switches.

14 Claims, 6 Drawing Sheets

(51) Int. Cl.
     *H02M 3/158*     (2006.01)
     *H02M 7/219*     (2006.01)
     *H02M 1/00*      (2006.01)

(52) U.S. Cl.
     CPC ............... *H02M 2001/0003* (2013.01); *H02M 2001/007* (2013.01)

(58) Field of Classification Search
     USPC .......................................................... 363/53
     See application file for complete search history.

(56) References Cited

U.S. PATENT DOCUMENTS

| | | | |
|---|---|---|---|
| 8,450,981 B2* | 5/2013 | Awane | H02M 1/4258 |
| | | | 320/127 |
| 9,099,891 B2* | 8/2015 | Pereira | H02J 3/1857 |
| 9,124,103 B2* | 9/2015 | Kawamoto | H02J 7/0031 |
| 2009/0160248 A1 | 6/2009 | Ang | |
| 2012/0155139 A1* | 6/2012 | Boeke | H02M 7/217 |
| | | | 363/131 |
| 2014/0265605 A1* | 9/2014 | Ishigaki | H02M 3/158 |
| | | | 307/80 |

* cited by examiner

AC/DC ELECTRICAL CONVERSION DEVICE PERMITTING ENERGY RECOVERY AND MANAGEMENT OF DC-SIDE SHORT-CIRCUITS

CROSS-REFERENCE TO RELATED PATENT APPLICATION

The present application is a National Stage Application of International Application No. PCT/EP2013/053015 entitled "AC/DC ELECTRICAL CONVERSION DEVICE PERMITTING ENERGY RECOVERY AND MANAGEMENT OF DC-SIDE SHORT-CIRCUITS" filed Feb. 14, 2013, which claims priority to French Patent Application Number 12 51507 filed Feb. 17, 2012, the contents of which are incorporated herein by reference in their entirety.

TECHNICAL FIELD

The present invention relates to an alternating current/direct current (AC/DC) electrical converter device for connecting between a single-phase or multiphase AC power distribution network and a DC power distribution network and having a short circuit management function on the DC network side.

It also has a function for recovering energy between the single-phase or multiphase AC power distribution network and the DC power distribution network. This AC/DC electrical converter device may be used in railway applications in particular. In railway applications, the DC electrical power distribution network is intended to supply DC power to a tractive rail vehicle via an electricity substation and a DC power supply line called a catenary.

PRIOR ART

There exist AC/DC electrical converter devices that include an AC/DC converter 3 employing diodes or thyristors to be connected between an AC voltage source 11 and a DC power distribution network 4 symbolized by a rectangle. The AC voltage source may take the form of an AC electrical power distribution network 1, the voltage of which is adapted by means of a transformer 2. This AC electrical power distribution network 1 is shown as a three-phase network in FIG. 1A. These electrical converter devices require filter devices 5, 6, generally of inductive type, upstream and downstream of the AC/DC converter 3. The result is bulky, notably because of the filter devices. A protection switch 7 must also be provided upstream of the transformer 2. Moreover, this AC/DC electrical converter device is not bidirectional because the AC/DC converter 3 includes diodes or thyristors. The DC power distribution network 4 is intended to feed a power supply substation (not shown) and a tractive rail vehicle draws its power from that power supply substation via a catenary. In this field in particular, it is beneficial to be able to recover energy when the tractive rail vehicle brakes. Another drawback is that the AC/DC electrical converter device is not able to limit a short-circuit current coming from the DC power distribution network connected on the DC side, and there is consequently a risk of the electrical converter device being damaged. Moreover, the transformer current must be uprated because of the presence of the filter devices.

Also known are AC/DC electrical converter devices that allow recovery of energy. One such device is shown in FIG. 1B.

As before, it includes a non-reversible AC/DC converter 3 connected on one side to the transformer 2 and on the other to the DC power distribution network 4, and also a DC/AC converter 10, also non-reversible, connected in series with an auto transformer 8, this combination constituting a parallel connection between the input and the output of the AC/DC converter 3. As in FIG. 1A, there are filter devices 5, 6, upstream and downstream of the AC/DC converter 3. There is also an additional filter device 9 between the DC/AC converter 10 and the auto transformer 8. A capacitor 14 is connected in parallel with the two input terminals 10.1, 10.2 of the DC/AC converter 10. A protection switch 7 is again provided between the transformer 2 and the AC electrical power distribution network 1 and there are two additional switches 12, 13, one between the transformer 2 and the AC/DC converter 3 and the other between the auto transformer 8 and the transformer 2.

The drawbacks of this device are the uprating of the transformer 2, the use of two converters 3 and 10, and the necessity for a complex control system.

The filter devices 5, 6, 9 absorb reactive power, with the result that the transformer 2 must be uprated in terms of its current rating. This leads to constraints on the DC/AC converter 10.

In conclusion, the two electrical converter devices shown in FIGS. 1A, 1B suffer from uprating of the transformer. The FIG. 1A electrical converter device is not reversible. That shown in FIG. 1B is complex in terms of control and is costly because it uses two converters. Moreover, these electrical converter devices are not able to limit short-circuit currents on the DC side.

SUMMARY OF THE INVENTION

An object of the present invention is specifically to propose a simplified alternating current/direct current (AC/DC) electrical converter device that is able to manage short circuits appearing on the DC side.

Another object of the invention is to propose an AC/DC electrical converter device having an energy recovery function that is more compact than the prior art device described above.

A further object of the invention is to propose an AC/DC electrical converter device having an energy recovery function that enables rectification with a power factor close to unity.

A further object of the invention is to propose an AC/DC electrical converter device having an energy recovery function that generates fewer harmonics in the power distribution network line current and therefore requires fewer filter devices than in the prior art.

An additional object of the present invention is to propose an AC/DC electrical converter device having an energy recovery function in which the DC voltage delivered in the energy source mode may be regulated actively.

A further object is to provide an AC/DC electrical converter device having an energy recovery function in which the transformer does not need to be oversized.

To be more precise, the present invention provides an AC/DC electrical converter device intended to be connected on the AC side to an AC voltage source and on the DC side to a DC power distribution network. It includes an AC/DC converter, a switching cell with two switches that are bidirectional for current, sharing a common point and each having a respective end terminal, an inductive filter stage, and a control unit for the switching cell; the converter is intended to be connected on the AC side to the AC voltage source and is connected on the DC side to the switching cell; in use, the first switch is connected between the converter and the DC power distribution network via the filter stage, the second switch forming a combination in parallel with the filter stage and the DC power distribution network, in energy source mode, in the absence of a short circuit on the DC power distribution network side, the control unit holds the second switch off and controls the first switch to turn it alternately on and off, in order to authorize flow of current from the converter towards the DC power distribution network via the first switch and the filter stage, and, in the presence of a short circuit, turns off the first switch and allows a short circuit current to flow from the DC power distribution network towards the filter stage via the second switch.

Each of the first and second switches of the switching cell advantageously includes a pair of electronic components connected in anti-parallel, one being of forced switching type and the other of natural switching type.

The short-circuit current flows through the natural switching electronic component of the second switch; this is a free-wheel current.

The forced switching electronic component may be a bipolar transistor, an MOS transistor, an IGBT transistor, a thyristor, a GTO thyristor, or an IGCT thyristor, and the natural switching electronic component may be a diode.

The electrical converter device further includes a current sensor placed between the common point and the filter stage, connected to the control unit, and intended to detect an increase above a threshold of a current flowing from the first switch towards the filter stage, this increase in the current reflecting the appearance of the short circuit.

It is preferable also to provide a capacitor intended to be connected in parallel with the DC power distribution network to smooth the voltage at the terminals of the DC power distribution network.

In energy recovery mode, when the voltage at the terminals of the electrical converter device on the DC side is greater than the voltage at the terminals of the converter on the DC side, the control unit turns off the second switch, enabling a recovery current to flow from the filter stage towards the converter via the first switch.

The recovery current flows in the natural switching electronic component of the first switch.

In energy recovery mode, when the voltage at the terminals of the electrical converter device on the DC side is less than the voltage at the terminals of the converter on the DC side, the control unit commands the second switch to turn it alternately on and off, in order to authorize when it is on an accumulation of energy in the filter stage and when it is off a release of that energy in the form of a recovery current flowing towards the converter via the first switch.

The recovery current flows in the natural switching electronic component of the first switch.

The electrical converter device may further include an energy storage device connected to the end terminals of the switching cell. Thus the recovery current is stored in the energy storage device and does not reach the AC voltage source. The converter does not need to be reversible.

With the same aim, the electrical converter device may alternatively further include a second switching cell with first and second switches bidirectional for current, connected in series and defining end terminals connected to the end terminals of the first switching cell and a common point, a second inductor filter stage and an energy storage device forming a series combination connected between the common point and the end terminal of the second switch of the second switching cell.

The present invention also provides a method of controlling an AC/DC electrical converter device adapted to operate in energy source mode or in energy recovery mode, intended to be connected, on the AC side, to an AC voltage source, and, on the DC side, to a DC power distribution network including an AC/DC converter, a switching cell with two switches that are bidirectional for current having a common point and an end terminal, and an inductive filter stage, the converter being intended to be connected on the AC side to the AC voltage source and being connected on the DC side to the switching cell; in use, the first switch is connected between the converter and the DC power distribution network via the filter stage, the second switch forming a combination in parallel with the filter stage and the DC power distribution network.

The method includes, in energy source mode, in the absence of a short circuit on the DC power distribution network side, a step of turning off the second switch and turning the first switch alternately on and off, in order to allow current to flow from the converter towards the DC power distribution network via the first switch and the filter stage and, in the presence of a short circuit, a step of turning off the first switch in which a short-circuit current flows from the DC power distribution network towards the filter stage via the second switch.

The method may include, in a first situation, in energy recovery mode, when a voltage at the terminals of the electrical converter device on the DC side is greater than a voltage at the terminals of the converter on the DC side, a step of turning off the second switch allowing a recovery current to flow from the filter stage towards the converter via the first switch.

In another situation, in energy recovery mode, when a voltage at the terminals of the electrical converter device on the DC side is less than a voltage at the terminals of the converter on the DC side, a step of controlling the second switch to turn it alternately on and off, and, when it is on, a step of accumulation of energy in the filter stage and, when it is off, a step of releasing that energy in the form of a recovery current flowing towards the converter via the first switch.

The duration and the amplitude of the short-circuit current may be adjusted by applying pulse width modulation to the first switch.

BRIEF DESCRIPTION OF THE DRAWINGS

The present invention can be better understood after reading the description of embodiments given by way of purely illustrative and non-limiting example with reference to the appended drawings, in which.

Identical, similar or equivalent parts in the various figures carry the same reference numbers to facilitate moving from one figure to another.

To make the figures easier to read, the various portions shown in the figures are not necessarily shown to a uniform scale.

Well-known structures are not shown in detail in order to avoid burdening the description of the present invention unnecessarily.

DETAILED DESCRIPTION OF PARTICULAR EMBODIMENTS

Figure 2A:
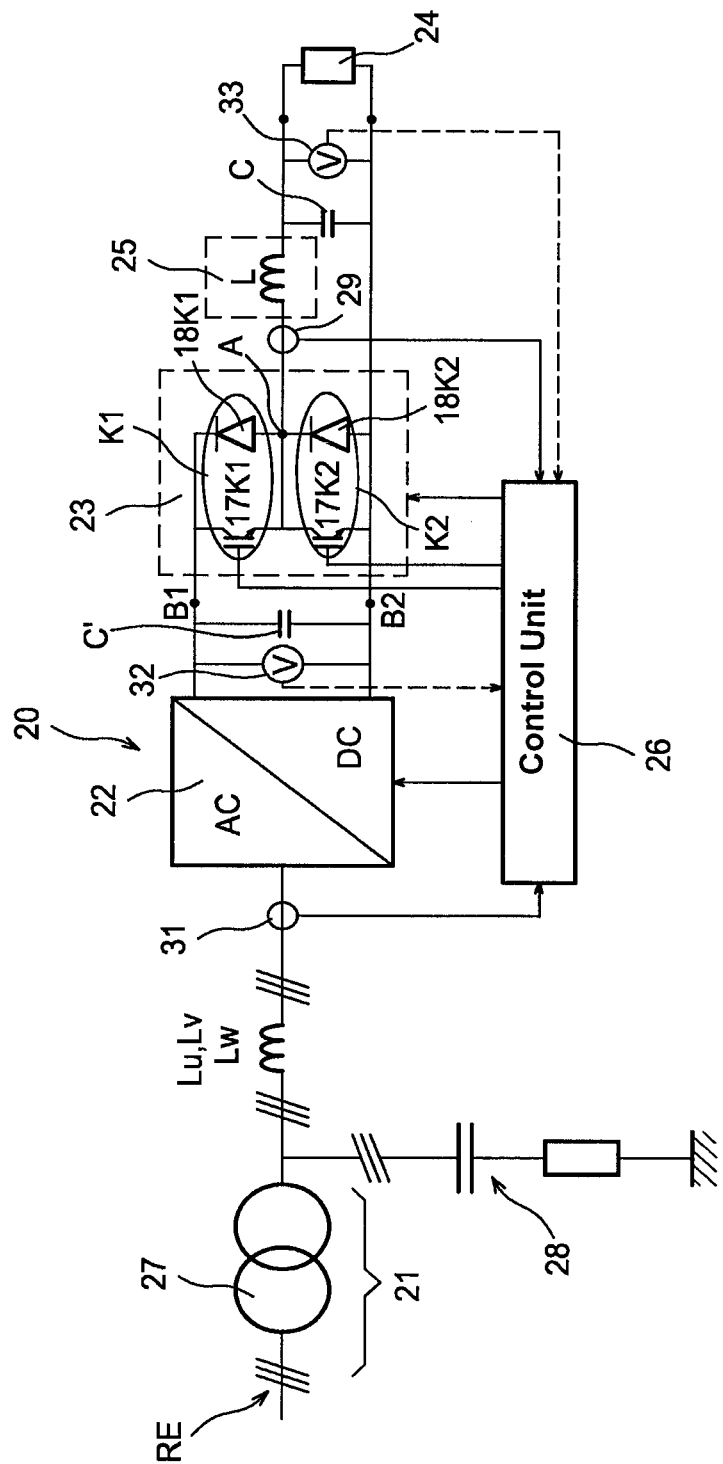
FIGS. 2A, 2B and 2C respectively show an example of an AC/DC electrical converter device of the invention, an electrical circuit diagram of one example of a reversible three-phase AC/DC converter, and an electrical circuit diagram of one example of the non-reversible single-phase AC/DC converter.
Figure 4A:
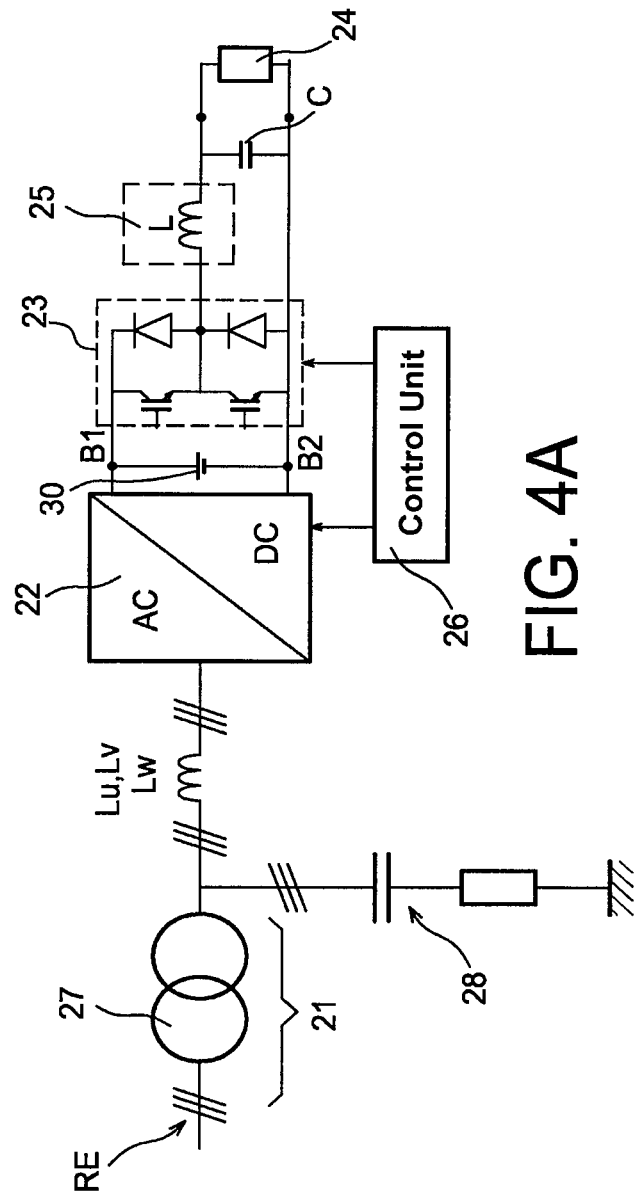
FIGS. 4A, 4B show two variants of AC/DC electrical converter devices of the invention, in which energy is recovered in an energy storage device without passing through the AC/DC converter.
Figure 4B:
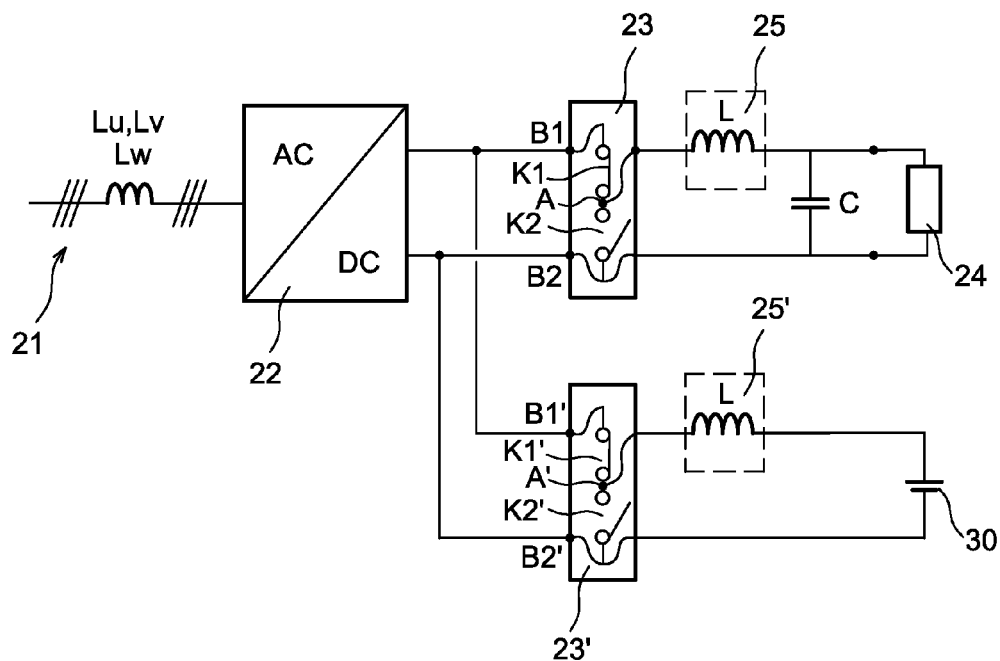

FIG. 2A shows an AC/DC electrical converter device of the invention. This AC/DC electrical converter device 20 is intended to be connected between an AC voltage source 21 and a DC power distribution network 24 treated as a direct current source. As mentioned above, the AC/DC electrical converter device 20 of the invention allows energy recovery. It may operate in two distinct modes, an energy source mode and an energy recovery mode. In the energy source mode, energy may flow from the AC voltage source 21 to the DC power distribution network 24 when the DC power distribution network 24 is consuming energy, for example when the DC power distribution network is feeding a substation intended to supply DC power to an accelerating tractive rail vehicle via a catenary (the catenary and the tractive rail vehicle are not shown). In some circumstances the DC power distribution network 24 may restore energy to the AC voltage source 21 via the AC/DC electrical converter device 20. Alternatively, as shown in FIGS. 4A, 4B, the DC power distribution network 24 may restore energy to an energy storage device via only a portion of the AC/DC electrical converter device 20. Energy is restored in this way while the tractive rail vehicle is braking This is the energy recovery mode.

In FIG. 2A, the AC voltage source 21 is shown as a multiphase and more particularly a three-phase source. It may comprise a three-phase electrical power distribution network RE associated with a transformer 27. The AC/DC electrical converter device 20 of the invention includes an alternating current/direct current (AC/DC) converter 22, a switching cell 23 and its control unit 26, and an inductive filter stage 25. The alternating current/direct current (AC/DC) converter 22 is intended to be connected on one side to the AC voltage source 21 and is connected on the other side to the switching cell 23. The AC/DC converter 22 may be reversible or non-reversible. A capacitor C' is connected to the terminals of the AC/DC converter 22 on the DC side.

The switching cell 23 includes two series-connected switches K1, K2 that are bidirectional for current and unidirectional for voltage. It is assumed that in the FIG. 2A example the AC/DC converter 22 is reversible, energy recovery being possible between the DC power distribution network 24 and the AC voltage source 21.

Each switch K1, K2 may be either on or off, as a function of a signal that it receives from the control unit 26. These two switches K1, K2 are not both on simultaneously since that would short circuit the AC/DC converter 22.

In the event of a short circuit on the DC power distribution network side, the switch K1 is off and the switch K2 is on for a reverse current so that the short-circuit current flows from the DC power distribution network to the filter stage via the switch K2. The switches are described in more detail below.

One side of each of the two switches K1, K2 is connected to a common point A and on their other sides form end terminals B1, B2 of the switching cell 23. These end terminals B1, B2 are connected to the AC/DC converter on the DC side. The first switch K1 is for connection in series between the converter 22 and the DC power distribution network 24 via the filter stage 25. The filter stage 25 is connected on one side to the common point A and is for connection on the other side to the DC power distribution network 24.

The second switch K2 is connected in parallel with the combination of the filter stage 25 and the DC power distribution network 24 when they are connected to each other. The DC power distribution network 24 is then connected between the filter stage 25 and the end terminal B2. The second switch K2 provides current continuity in the DC power distribution network 24 when the first switch K1 is off.

Since they are bidirectional for current, each of the switches K1, K2 comprises a forced switching electronic component 17K1, 17K2 and a natural switching electronic component 18K1, 18K2 connected in anti-parallel. The forced switching component 17K1, 17K2 may be a bipolar transistor, a metal oxide of silicon (MOS) transistor, an insulated gate bipolar transistor (IGBT), an integrated gate-commutated thyristor (IGCT), a thyristor, or a gate turn off (GTO) thyristor. The choice depends in particular on the power involved and on the required performance in terms of speed.

The natural switching electronic component 18K1, 18K2 is shown as a diode.

Each switch K1 or K2 is on for a forward current when its forced switching electronic component is on and allows that current to flow. It is on for a free-wheel reverse current when its forced switching electronic component is off and its natural switching electronic component allows the reverse current to flow.

Figure 2B:
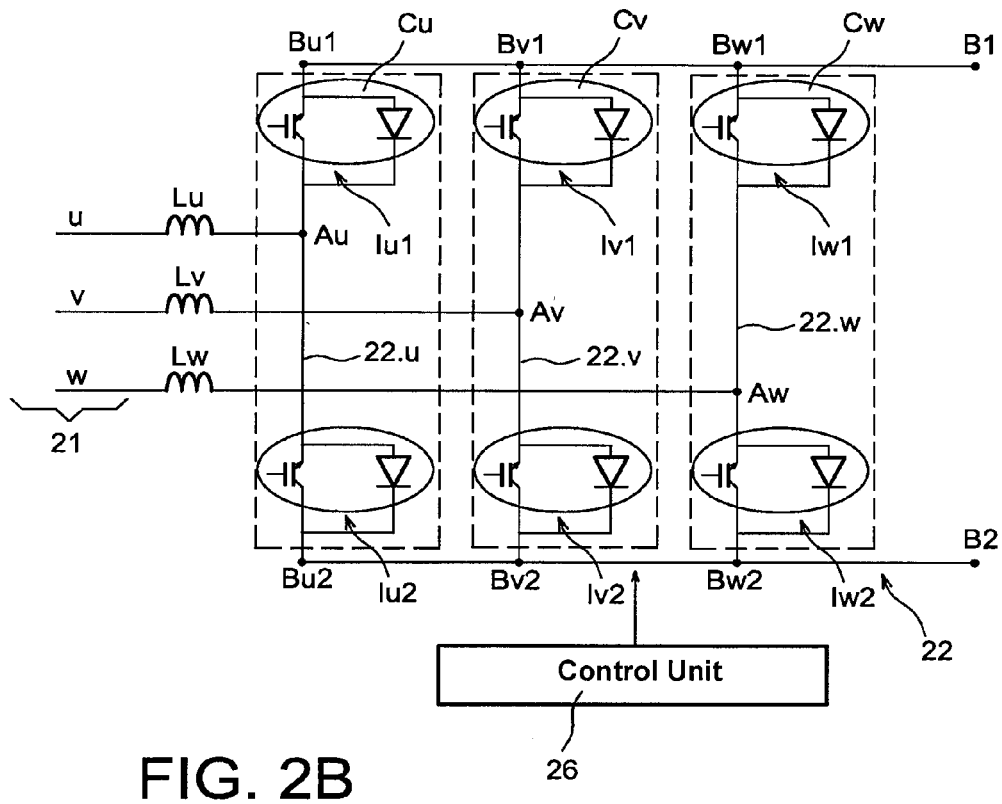

Refer now to FIG. 2B. The AC/DC converter 22 may be a conventional Graetz bridge type converter with three arms 22.u, 22.v, 22.w associated with respective phases u, v, w of the AC voltage source 21. The transformer is not shown in FIG. 2B. In each arm 22.u, 22.v, 22.w there is a switching unit Cu, Cv, Cw including two end terminals Bu1, Bu2, Bv1, Bv2, Bw1, Bw2, one connected to the terminal B1 and thus to the first switch K1 and the other to the terminal B2 and thus to the second switch K2, and a middle terminal Au, Av, Aw connected to the associated phase u, v, w.

It is assumed that in the FIG. 2A embodiment the AC/DC electrical converter device 20 is reversible, i.e. that energy can propagate from the AC voltage source 21 to the DC power distribution network 24 and vice-versa. The FIG. 2B AC/DC converter 22 is also reversible and has, in addition to a rectifier mode for feeding the DC power distribution network 24, an inverter mode for supplying the AC voltage source 21 with an AC voltage. Each switching unit Cu, Cv, Cw is then bidirectional for current and includes two switches Iu1, Iu2, Iv1, Iv2, Iw1, Iw2 connected in series and operating in opposition, each breaking or making the current between one of the end terminals Bu1 or Bu2, Bv1 or Bv2, Bw1 or Bw2 and the middle terminal Au, Av, Aw. Each switch Iu1, Iu2, Iv1, Iv2, Iw1, Iw2 may comprise a forced switching electronic component and a natural switching electronic component connected in anti-parallel.

The forced switching electronic component may be a bipolar transistor, an MOS transistor, an IGBT transistor, an IGCT thyristor, a thyristor, or a GTO thyristor. The natural switching electronic component may be a diode. The forced switching and natural switching electronic components are not referenced in FIG. 2B, but can clearly be seen. The forced switching electronic components are controlled by the control unit 26.

Figure 2C:
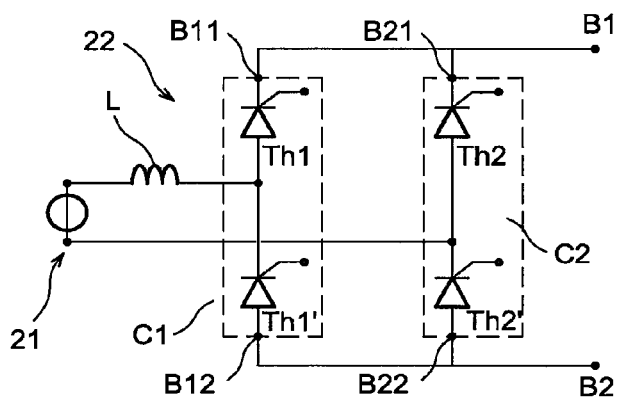

FIG. 2C shows a non-reversible single-phase AC/DC converter 22. It has only two arms 22.1, 22.2, each connected to a terminal of the AC voltage source 21.

In each arm 22.1, 22.2 there is a switching unit C1, C2 including two end terminals B11, B12, B21, B22, one connected directly to the terminal B1 and thus to the first switch K1 and the other to the terminal B2 and thus to the second switch K2, and a middle terminal A11, A22, one of which is connected to one of the terminals of the AC voltage source 21 and the other to the other terminal of the AC voltage source 21.

Each switching unit C1, C2 is unidirectional for current and comprises two switches Th1, Th1', Th2, Th2' connected in series and operating in opposition, each breaking or making the current between one of the end terminals B11 or B12, B21 or B22, and the middle terminal A11, A22. Each switch Th1, Th1', Th2, Th2' comprises a single forced switching electronic component. The forced switching electronic component Th1, Th1', Th2, Th2' may be a bipolar transistor, an MOS transistor, an IGBT transistor, an IGCT thyristor, a thyristor, or a GTO thyristor. The forced switching electronic components Th1, Th1', Th2, Th2' are shown as thyristors. The control unit for the forced switching electronic components is not shown in FIG. 2C. It is understood that the forced switching electronic components in FIG. 2C could be replaced by natural switching electronic components.

It is to be understood that the two AC/DC converters 22 shown are not limiting on the invention, and that the AC/DC converter could be a multiphase converter and non-reversible or a single-phase converter and reversible. If it is a multiphase converter, it could have more than three phases.

The AC/DC electrical converter device of the invention further includes a filter stage 25 on the DC side, as already stated. This filter stage 25 includes a smoothing inductor L connected between the common point A and the DC power distribution network 24. It is known that such an inductor opposes fast variation of the current passing through it. It is further possible to provide a connecting capacitor C in parallel with the DC power distribution network 24, connected between the filter stage 25 and the second switch K2, at the level of the terminal B2. The inductor L and the capacitor C are assigned values that depend on the performance required for the application in question.

It is assumed that in FIG. 2A, on the AC side, the AC voltage source 21 is a three-phase electrical power distribution network RE delivering a voltage that must be adapted in the energy source mode of the electrical converter device, for which purpose there is provided a three-phase transformer 27 connected between the electrical power distribution network RE and the AC/DC converter 22. This transformer 27 also has an electrical isolation role.

On the AC side, there is also provided a smoothing inductor Lu, Lv, Lw for each phase in the multiphase configuration or a single inductor L' in the single-phase configuration. Each smoothing inductor is connected between the secondary of the transformer 27 and the AC/DC converter 22. These features correspond to the energy source mode.

An RC type filter stage 28 is also provided in parallel with the transformer 27 to filter harmonics appearing at the level of the secondary of the transformer 27 in the energy source mode.

The control unit 26 is adapted to control both the switching cell 23 and the AC/DC converter 22 if it includes any forced switching electronic components. The control unit 26 may employ pulse width modulation (PWM) to turn on or off the forced switching electronic components of the switching cell 23 and the forced switching electronic components of the AC/DC converter 22. By adjusting this modulation, it is then possible to regulate at will the output voltage of the electrical converter device 20 on the DC power distribution network side in the energy source mode.

A current sensor 29 is disposed between the common point A and the filter stage 25, this current sensor 29 being connected to the control unit 26. Its function is explained below. A current sensor 31 is placed between each smoothing inductor Lu, Lv, Lw and the AC/DC converter on the AC side. Voltage sensors are placed firstly at the terminals of the AC/DC converter 22 on the DC side and secondly at the terminals of the electrical converter device 20 on the DC side. These voltage sensors are respectively referenced 32 and 33.

Figure 3A:
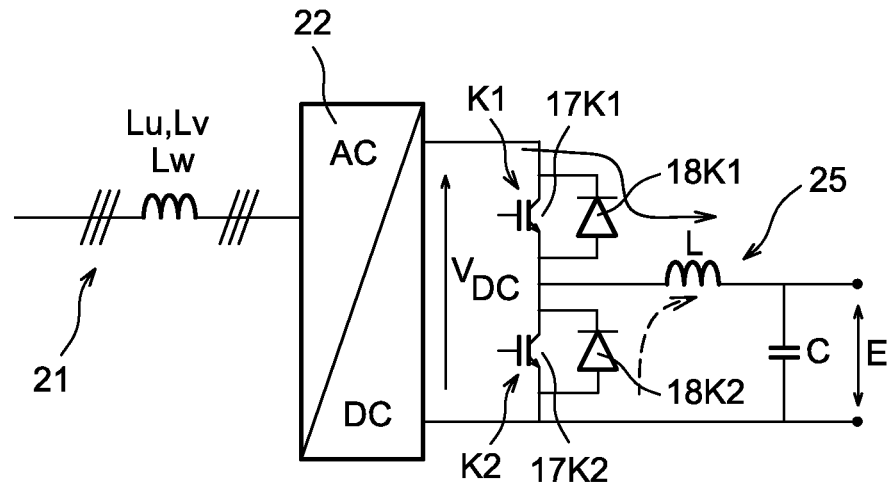
FIGS. 3A and 3B relate to the FIG. 2A AC/DC electrical converter device, and they show the directions of flow of the currents in energy source mode in normal operation and in the presence of a short-circuit on the DC power distribution network side, and in energy recovery mode, depending on the value of the voltage at the terminals of the DC power distribution network relative to the voltage at the terminals of the converter on the DC side.
Figure 3B:
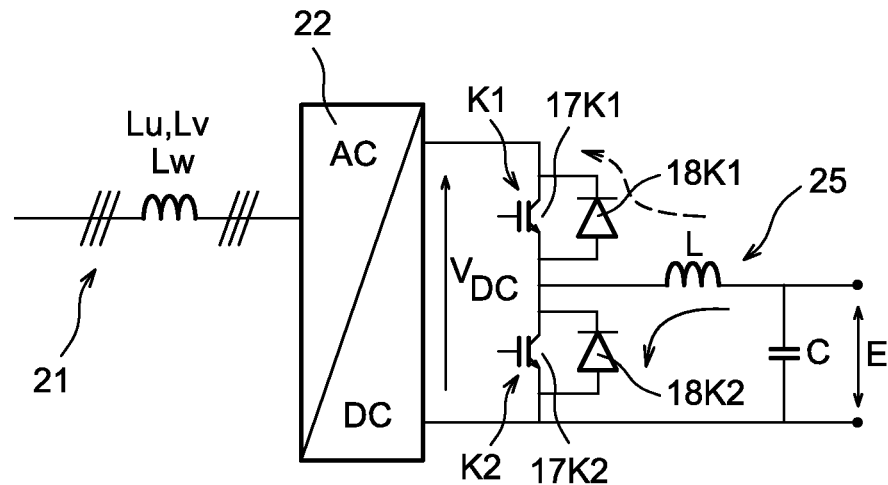

Refer now to FIGS. 3A and 3B, which show the direction of flow of current in the switching cell 23 according to whether the AC/DC electrical converter device of the invention is operating in energy source node or in energy recovery mode. The description covers both operation in energy source mode when a short circuit appears on the DC power distribution network 24 side and also methods of controlling the electrical converter device of the invention. In the railway application, such a short circuit would occur between the catenary and ground.

In energy source mode, the AC/DC converter 22 is on and rectifies an alternating current delivered by the AC voltage source 21. During normal operation with no faults, the second switch K2 is off for a forward current coming from the AC/DC converter 22, i.e. its forced switching electronic component 17K2 is off and only the forced switching electronic component 17K1 controlled by the control unit 26 can conduct this forward current. When the forced switching switch 17K1 conducts, this forward rectified direct current delivered by the AC/DC converter 22 flows through it. This forward current cannot pass through the second switch K2 because its forced switching electronic component 17K2 is off. This current is intended to feed the DC power distribution network 24 via the filter stage 25. The value of the voltage at the terminals of the DC power distribution network 24 depends on the voltage at the terminals of the switching cell 23 and how the forced switching electronic component 17K1 is controlled. This component may be controlled by pulse width modulation (PWM) by the control unit 26. The flow of this current is shown by the solid line arrow that passes through the filter stage 25 in FIG. 3A.

If the current sensor 29 detects an increase in the current absorbed by the DC power distribution network such that its value rises above a threshold, the control unit 26 turns off the first switch K1, i.e. turns off its forced switching electronic component 17K1 and the AC/DC converter if it includes any forced switching electronic components. If the AC/DC converter 22 does not include any forced switching components, it supplies energy to the capacitor C'. This capacitor is not shown in FIGS. 3A, 3B to avoid overcrowding the figures.

This means that a short circuit has occurred on the DC power distribution network 24 side.

The forced switching electronic component 17K2 of the second switch K2 is also kept off for a forward current, but its natural switching electronic component 18K2 is on for a free-wheel reverse current. A short-circuit current then flows through it and flows through the filter stage 25 towards the DC power distribution network 24 (see the dashed-line arrow in FIG. 3A). The switching cell 23 functions as a voltage reducer.

It is possible to adjust the amplitude and the duration of the short-circuit current by controlling conduction of the first switch K1 by pulse width modulation. Operation may be in a voltage reducing mode. In the railway field, it may be necessary to maintain the short-circuit current for a required time, for example of the order of one hundred milliseconds.

In energy recovery mode, if the voltage E at the terminals of the electrical converter device 20 on the DC side is greater than the voltage $V_{DC}$ at the terminals of the AC/DC converter 22 on the DC side, the control unit 26 turns off the second switch K2 via its forced switching electronic component 17K2 for a forward current. The first switch K1 is on for a free-wheel reverse current but its forced switching electronic component 17K1 is off. A recovery current flows from the filter stage 25 towards the AC/DC converter 22 via the natural switching electronic component 18K1 of the first switch K1. This recovery current is a reverse current. The path of the recovery current is shown by the dashed-line arrow in FIG. 3B. The AC/DC converter may operate as an inverter for converting direct current into alternating current.

Still in energy recovery mode, if the voltage E at the terminals of the electrical converter device 20 on the DC side is less than the voltage $V_{DC}$ at the terminals of the AC/DC converter 22 on the DC side, the control unit 26 controls the second switch K2 and thus its forced switching electronic component 17K2, for example using PWM, to turn it alternately on and off for a forward current. When the second switch K2 is on, its forced switching electronic component 17K2 being on, the recovery current coming from the DC power distribution network 24 via the filter stage 25 flows through it and energy is accumulated in the inductor L of the filter stage 25. When the second switch K2 is off for a forward current, its forced switching electronic component 17K2 being off, this energy is released in the form of a free-wheel recovery current flowing towards the AC/DC converter 22 via the first switch K1 of the switching cell 23 and more particularly via its natural switching electronic component 18K1. Its forced switching electronic component 17K1 is then off. The switching cell 23 functions as a voltage booster. The AC/DC converter may be on and function as an inverter.

Energy is restored to the AC voltage source 21 and the AC/DC converter 22 adapts the phase of the current to be restored to that of the voltage from the AC voltage source 21.

With such an energy recovery AC/DC electrical converter device, a power factor is obtained that is close to unity because of the presence of the switching cell 23 between the AC/DC converter 22 and the DC power distribution network 24.

Figure 1A:
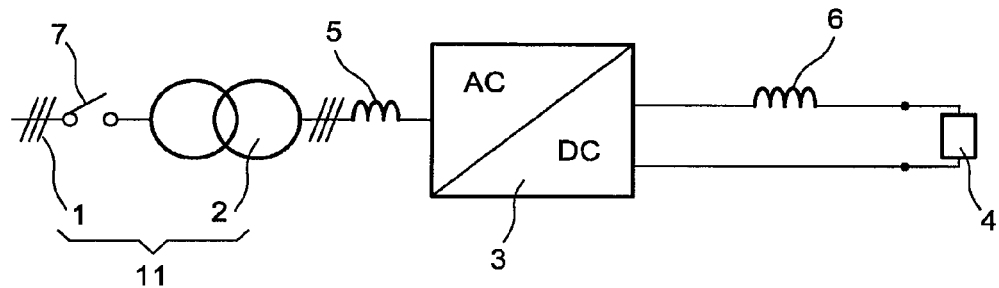
FIGS. 1A and 1B show prior art AC/DC electrical converter devices, with only the device in FIG. 1B being reversible.
Figure 1B:
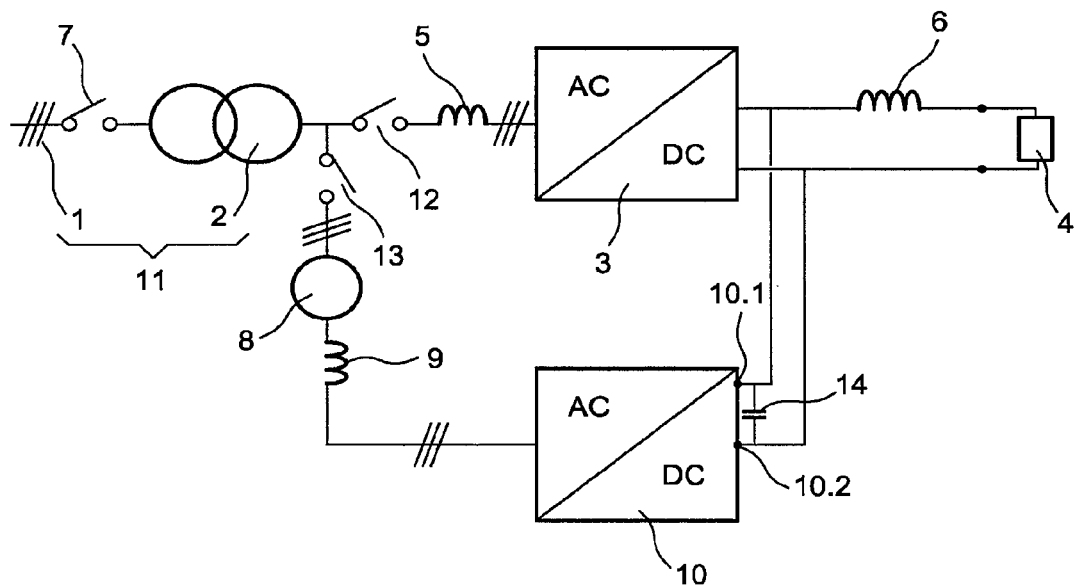

Compared to the FIG. 1B configuration, the number of inductor filter devices is reduced. Consequently, it is no longer necessary to uprate the transformer, as in the prior art.

With such a converter device, the overall losses are reduced compared to the FIG. 1B device whilst ensuring that short circuits are managed.

Described below are two other embodiments in which the AC/DC converter 22 does not need to be reversible because energy recovery is not relevant. Only the switching cell 23 is reversible. Refer now to FIG. 4A.

FIG. 4A shows energy storage means 30 connected to the end terminals B1, B2 of the switching cell 23. These energy storage means 30 may be a storage battery or a series of capacitors having high storage capacity, such as supercapacitors.

In this energy recovery mode, energy is stored upstream of the AC/DC converter, without passing through it and thus without reaching the power distribution network RE. The AC/DC converter then does not need to be reversible; and if it is reversible, the control unit 26 turns it off.

In FIG. 4B, the electrical converter device further includes a second switching cell 23' similar to the first, having end terminals B1', B2' that are connected to the end terminals B1, B2 of the first switching cell 23. There are no changes in respect of the connection to the DC power distribution network 24.

The bidirectional switches K1' and K2' of the second switching cell 23' are similar to those of the first switching cell with a forced switching electronic component and a natural switching electronic component.

The middle point between the two switches is denoted A'. The energy storage means 30 are connected between the middle point A' and the end terminal B2' of the second switching cell 23' via an inductor filter stage 25'. The filter stage 25' is connected between the middle point A' and the energy storage means 30.

The control unit 26 may be common to both switching cells 23, 23', but this is not essential, and each of these cells may have its own control unit. For simplicity, FIG. 4B does not show a control unit.

In energy recovery mode, the first switching cell 23 functions as described above with reference to FIG. 3B and the second switching cell 23' functions in energy source mode with recovery of energy from the first switching cell 23. This energy flows towards the energy storage means 30 in the second switching cell 23' via the forced switching electronic component of the first switch K1' when it is on. The second switch K2' is off, which means that its forced switching electronic component 17K2' is off. In this configuration, in energy recovery mode, the AC/DC converter 22 need not be reversible; and if it is reversible, the control device 26 keeps it off.

An advantage of the FIG. 4B configuration over the FIG. 2B configuration is that in energy recovery mode no energy is sent to the AC electrical power distribution network 21. It is stored in the energy storage means 30. This injection of energy into the AC electrical power distribution network causes problems. In the railway application, the AC electrical power distribution network belongs to one entity, while the DC power distribution network belongs to another. Purchase of this energy must be authorized and negotiated.

Although embodiments of the AC/DC electrical converter device able to operate in energy source mode or in energy recovery mode are shown and described above in detail, it should be understood that various changes and modifications may be made without departing from the ambit of the invention.

The invention claimed is:

1. An AC/DC electrical converter device intended to be connected on the AC side to an AC voltage source and on the DC side to a DC power distribution network, comprising an AC/DC converter, a switching cell with two switches (K1, K2) that are bidirectional for current, sharing a common point (A) and each having a respective end terminal (B1, B2), an inductive filter stage, a control unit for the switching cell; characterized in that it further comprises a current sensor placed between the common point (A) and the filter stage, and connected to the control unit, intended to detect an increase above a threshold of a current flowing from the first switch (K1) towards the filter stage, this increase in the current reflecting the appearance of the short circuit, the converter being intended to be connected on the AC side to the AC voltage source and being connected on the DC side to the switching cell; in use, the first switch (K1) is connected between the converter and the DC power distribution network (24) via the filter stage, the second switch (K2) forming a combination in parallel with the filter stage and the DC power distribution network; in energy source mode, in the absence of a short circuit on the DC power distribution network side, the control unit holds the second switch (K2) off and controls the first switch (K1) to turn it alternately on and off, in order to authorize flow of current from the converter towards the DC power distribution network via the first switch (K1) and the filter stage, and, in the presence of a short circuit, turns off the first switch (K1) and allows a short circuit current to flow from the DC power distribution network towards the filter stage via the second switch (K2) and adjusts the amplitude and the duration of the short-circuit current by controlling conduction of the first switch (K1) by pulse width modulation.

2. An electrical converter device according to claim 1, wherein each of the first and second switches (K1, K2) of the switching cell includes a pair of electronic components (17K1, 18K1; 17K2, 18K2) connected in anti-parallel, one being of forced switching type and the other of natural switching type.

3. An electrical converter device according to claim 2, wherein the short-circuit current flows through the natural switching electronic component (18K2) of the second switch (K2).

4. An electrical converter device according to claim 2, wherein the forced switching electronic components (17K1, 17K2) is a bipolar transistor, an MOS transistor, an IGBT transistor, a thyristor, a GTO thyristor, or an IGCT thyristor and the natural switching electronic component (18K1, 18K2) is a diode.

5. An electrical converter device according to claim 1, further including a capacitor (C) intended to be connected in parallel with the DC power distribution network.

6. An electrical converter device according to claim 1, wherein, in energy recovery mode, when the voltage (E) at the terminals of the electrical converter device on the DC side is greater than the voltage ($V_{DC}$) at the terminals of the converter on the DC side, the control unit turns off the second switch (K2), enabling a recovery current to flow from the filter stage towards the converter via the first switch (K1).

7. An electrical converter device according to claim 6, wherein the recovery current flows in the natural switching electronic component (18K1) of the first switch (K1).

8. An electrical converter device according to claim 1, wherein in energy recovery mode, when the voltage (E) at the terminals of the electrical converter device on the DC side is less than the voltage ($V_{DC}$) at the terminals of the converter on the DC side, the control unit commands the second switch (K2) to turn it alternately on and off, in order to authorize when it is on an accumulation of energy in the filter stage and when it is off a release of that energy in the form of a recovery current flowing towards the converter via the first switch (K1).

9. An electrical converter device according to claim 8, wherein the recovery current flows in the natural switching electronic component (18K1) of the first switch (K1).

10. An electrical converter device according to claim 1, further including energy storage means connected to the end terminals (B1, B2) of the switching cell.

11. An electrical converter device according to claim 1, wherein the switching cell is a first switching cell, the electrical converter device further including a second switching cell with first and second switches (K1', K2') bidirectional for current, connected in series and defining end terminals (B1', B2') connected to the end terminals (B1, B2) of the first switching cell and a common point (A'), a second inductor filter stage and energy storage means forming a series combination connected between the common point (A') and the end terminal (B2') of the second switch (K2') of the second switching cell.

12. A method of controlling an AC/DC electrical converter device adapted to operate in energy source mode or in energy recovery mode, intended to be connected, on the AC side, to an AC voltage source, and, on the DC side, to a DC power distribution network including an AC/DC converter, a switching cell with two switches (K1, K2) that are bidirectional for current having a common point (A) and an end terminal (B1, B2), an inductive filter stage, a control unit for the switching cell, a current sensor placed between the common point (A) and the filter stage, and connected to the control unit, intended to detect an increase above a threshold of a current flowing from the first switch (K1) towards the filter stage, this increase in the current reflecting the appearance of the short circuit, the converter being intended to be connected on the AC side to the AC voltage source and being connected on the DC side to the switching cell; in use, the first switch (K1) is connected between the converter and the DC power distribution network via the filter stage, the second switch (K2) forming a combination in parallel with the filter stage and the DC power distribution network;

the method including, in energy source mode, in the absence of a short circuit on the DC power distribution network side, a step of turning off the second switch (K2) and turning the first switch (K1) alternately on and off, in order to allow current to flow from the converter towards the DC power distribution network via the first switch (K1) and the filter stage and, in the presence of a short circuit, a step of turning off the first switch (K1) in which a short-circuit current flows from the DC power distribution network towards the filter stage via the second switch (K2), and a step of adjusting the duration and the amplitude of the short-circuit current by applying pulse width modulation to the first switch (K1).

13. A control method according to claim 12, including in energy recovery mode, when a voltage (E) at the terminals of the electrical converter device on the DC side is greater than a voltage ($V_{DC}$) at the terminals of the converter on the DC side, a step of turning off the second switch (K2) allowing a recovery current to flow from the filter stage towards the converter via the first switch (K1).

14. A control method according to claim 12, including in energy recovery mode, when a voltage (E) at the terminals of the electrical converter device on the DC side is less than a voltage ($V_{DC}$) at the terminals of the converter on the DC side, a step of controlling the second switch (K2) to turn it alternately on and off, and, when it is on, a step of accumulation of energy in the filter stage and, when it is off, a step of releasing that energy in the form of a recovery current flowing towards the converter via the first switch (K1).

* * * * *